Figure 1:
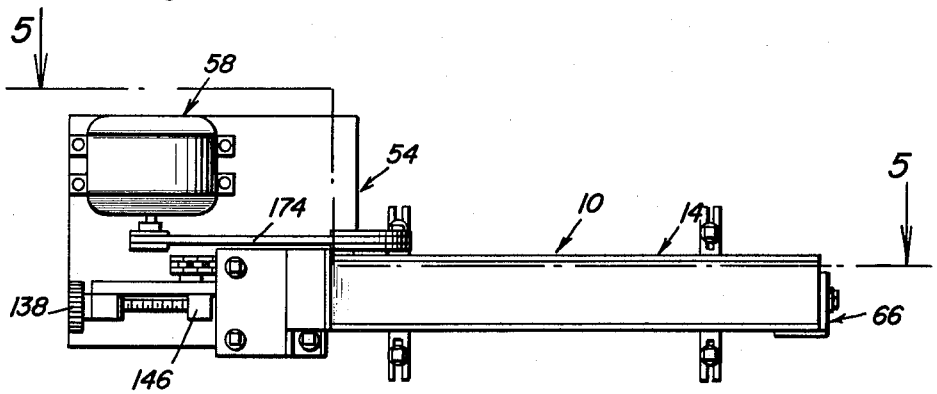

July 28, 1964 M. ORESCAN 3,142,321
BAND SAW

Filed June 29, 1961 3 Sheets-Sheet 1

Michael Orescan
INVENTOR.

BY *Clarence A. O'Brien*
*and Harvey B. Jacobson*
Attorneys

July 28, 1964                    M. ORESCAN                    3,142,321
                                  BAND SAW
Filed June 29, 1961                                        3 Sheets-Sheet 2

Michael Orescan
        INVENTOR.

BY *Clarence A. O'Brien*
   *and Harvey B. Jacobson*
                    Attorneys July 28, 1964   M. ORESCAN   3,142,321
BAND SAW Filed June 29, 1961   3 Sheets-Sheet 3

Michael Orescan
INVENTOR.

United States Patent Office 3,142,321
Patented July 28, 1964

3,142,321
BAND SAW
Michael Orescan, Toronto, Ontario, Canada
(R.R. 1, Harriston, Ontario, Canada)
Filed June 29, 1961, Ser. No. 120,576
7 Claims. (Cl. 143—21)

This invention relates to a novel and useful band saw and more specifically to a band saw of conventional design including a C-shaped frame having a pair of spaced support arms extending laterally to one side of and from points spaced longitudinally along an elongated connecting support member extending between corresponding end portions of the arms of the frame.

One of the arms of the frame is mounted for movement toward and away from the other arm and each of the arms includes a plurality of antifriction roller means spaced and curved longitudinally of the arms defining arcuate paths opening toward each other. An endless flexible band saw blade is entrained over the roller guide means of each arm and the band saw blade includes a first portion adjacent and generally paralleling the elongated support member and a second portion extending between the free ends of the arms. One of the arms is mounted for movement toward and away from the other arm and motor means is stationarily mounted relative to the other arm with drive means being provided for drivingly connecting the motor means and one of the roller means carried by the movable arm. The drive means includes means capable of maintaining a drive connection between the one roller means carried by the movable arm and the motor means throughout adjusted movement of the movable arm relative to the stationary arm. In this manner, the arms may be moved toward and away from each other in order to provide a throat of varying dimensions. Of course it is to be realized that saw blades of different sizes must be used when the throat of the C-shaped frame is varied. However, the band saw of the instant invention is specifically constructed in order to enable rapid changing of a saw blade. Inasmuch as the drive means includes means capable of maintaining a drive connection between the drive roller means carried by the movable arm and the motor means throughout movement of the movable arm relative to the stationary arm, little attention is required by the drive means when varying the throat of the C-shaped frame.

The main object of this invention is to provide a band saw provided with a generally C-shaped frame whose throat opening may be readily adjusted and whose blade may be readily changed in order that the throat of the band saw may be varied as desired with little effort.

A further object of this invention, in accordance with the immediately preceding object, is to provide drive means for drivingly connecting a motor means carried by the stationary portion of the band saw frame and a drive roller carried by the movable portion of the band saw frame.

Still another object of this invention is to provide a band saw having a tiltable worktable positioned at the free end of one of the arms of the C-shaped frame of the band saw.

Yet another object of this invention is to provide a drive means including a plurality of elongated endless flexible members and means for adjusting the tension of each of the elongated flexible members.

A final object to be specifically enumerated herein is to provide a band saw in accordance with the preceding objects which will conform to conventional forms of manufacture, be of simple construction and easy to use so as to provide a device that will be economically feasible, long lasting and relatively trouble free in operation.

Figure 2:
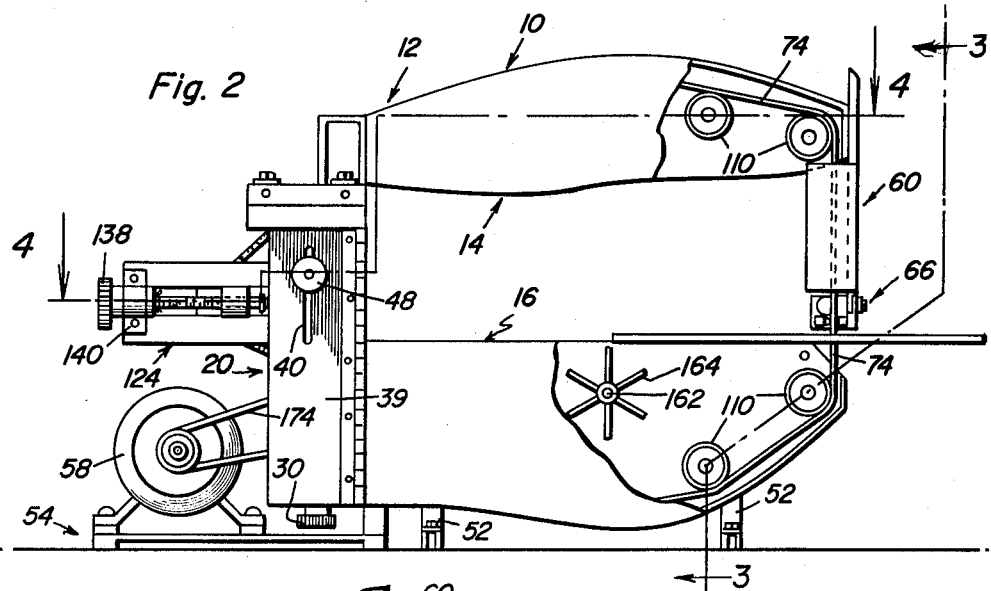
Figure 7:
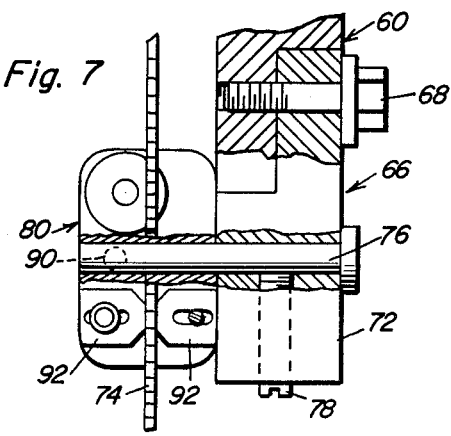
Figure 4:
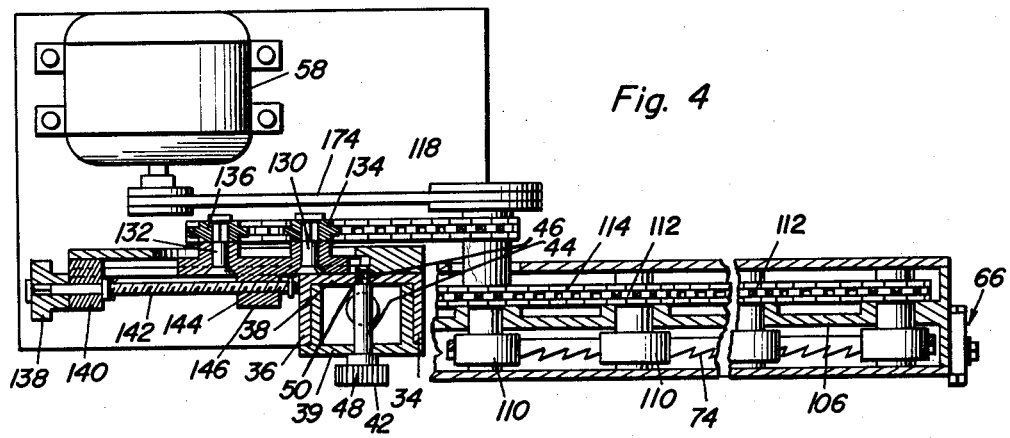
Figure 6:
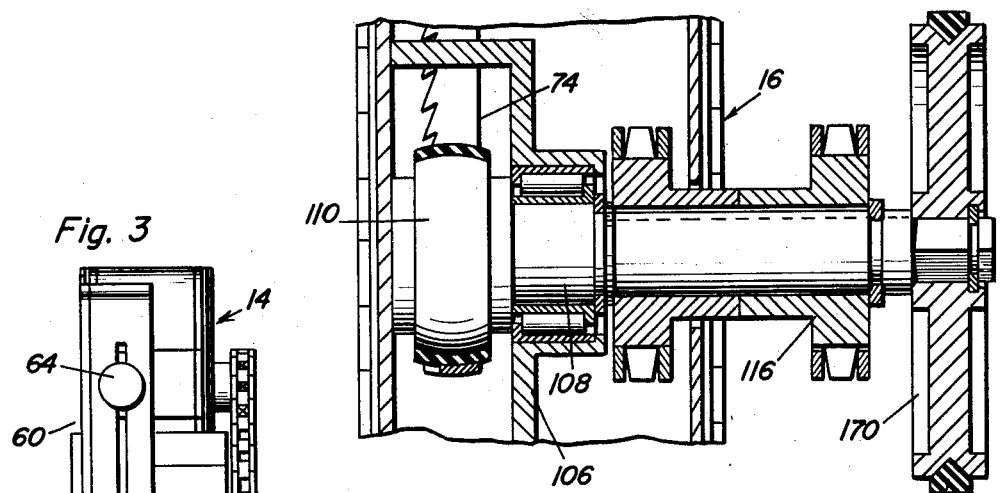
Figure 3:
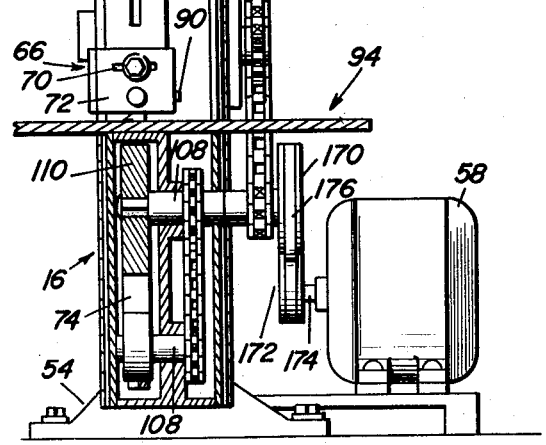
Figure 5:
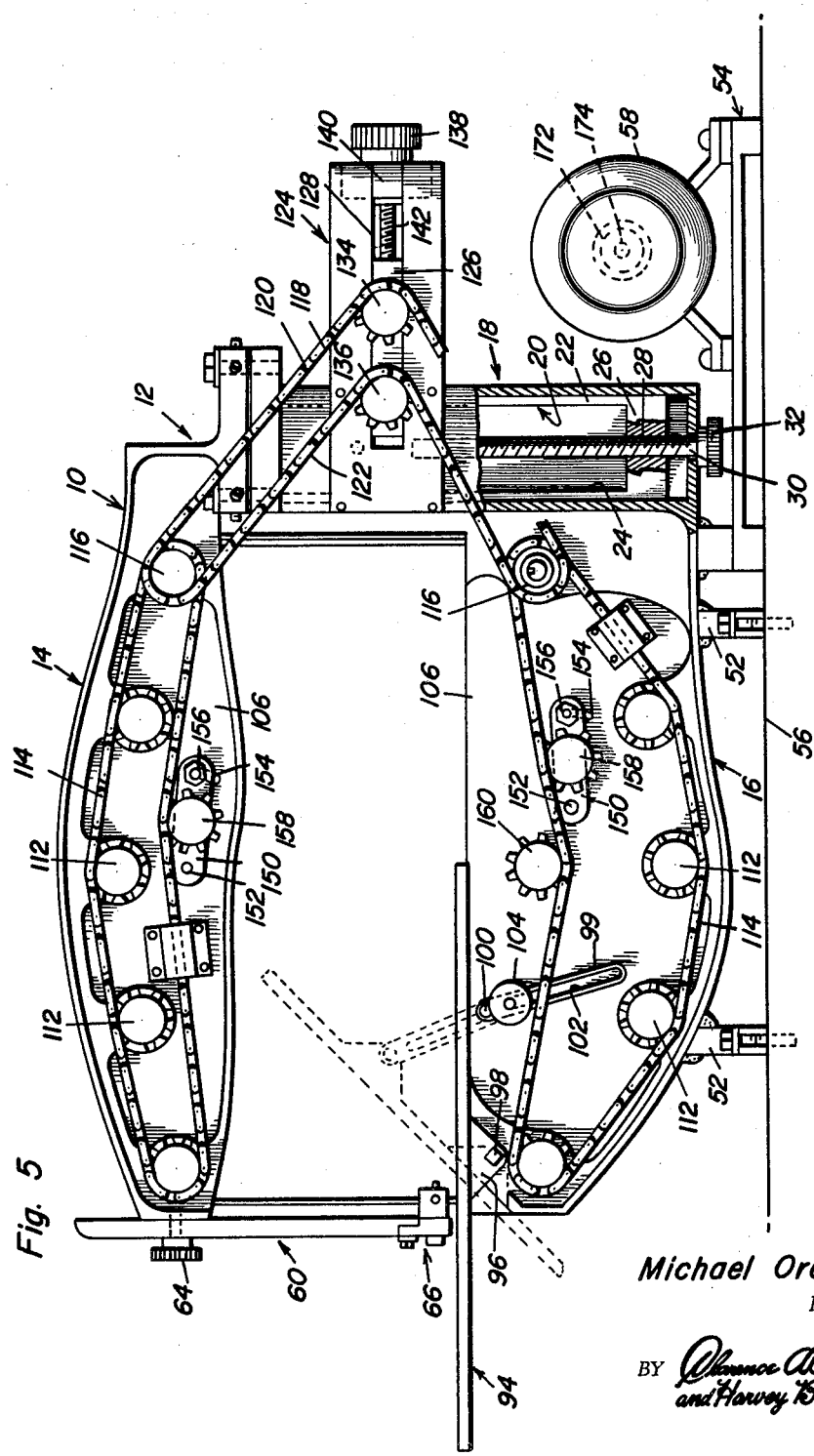

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the band saw;
FIGURE 2 is a side elevational view of the band saw with portion thereof being broken away;
FIGURE 3 is an end elevational view of the band saw as seen from the right side of FIGURE 2 and with lower portions thereof being broken away and shown in transverse vertical section;
FIGURE 4 is a fragmentary enlarged horizontal sectional view taken substantially upon the plane indicated by the section line 4—4 of FIGURE 2;
FIGURE 5 is an enlarged vertical sectional view taken substantially upon the plane indicated by the section line 5—5 of FIGURE 1;
FIGURE 6 is a fragmentary transverse sectional view illustrating the manner in which the drive means of the saw is drivingly connected to the roller drive means of the pair of arms of the C-shaped frame; and
FIGURE 7 is a fragmentary enlarged side elevational view illustrating the details of construction and mounting of the anti-friction guide means positioned immediately adjacent the worktable of the band saw.

Referring now more specifically to the drawings the numeral 10 generally designates the band saw of the instant invention. With attention now directed more specifically to FIGURE 5 of the drawings it will be noted that the band saw 10 includes a generally C-shaped frame generally referred to by the reference numeral 12. The frame 12 includes first and second arms or arm members generally referred to by the reference numerals 14 and 16 and an upright elongated support member generally referred to by the reference numeral 18. The upstanding support member 18 is tubular and the upper arm 14 includes a substantially right angled leg portion generally referred to by the reference numeral 20 which is complementary in cross section to the support member 18 and is snugly and slidably received therein. The leg portion 20 includes a pair of generally parallel supports 22 and 24 which are interconnected at their lower ends by means of web portion 26. The web portion 26 includes an internally threaded bore 28 and an adjustment screw 30 rotatably supported from the support member 18 is threadedly engaged in the bore 28 whereby rotation of the knob 32 of the screw 30 will effect movement of the arm 14 toward and away from the arm 16.

The support member 18 is actually U-shaped in cross section as can best be viewed from FIGURE 4 of the drawings and includes a pair of longitudinally extending leg portions 34 and 36 interconnected by means of a bight portion 38. The supports 22 and 24 of the leg portion 20 are interconnected by means of a cover plate 39 and the cover plate 39 is provided with an elongated longitudinally extending slot 40. A lock screw 42 having a shank portion 44 is slidingly disposed in the slot 40 and the shank portion 44 is provided with a diametrically reduced threaded portion 46 on one end and a knob 48 on its other end. The diametrically reduced end portion 46 is threadedly engaged in a bore 50 formed in the bight portion 38 and in this manner adjustment of the screw 30 is maintained by tightening of the lock screw 42.

It will be noted that the arm 16 includes a plurality of mounts 52 and a base portion generally referred to by the reference numeral 54. The mounts 52 and the base portion 54 may be secured to a supporting surface 56 in any convenient manner and an electric motor 58 is secured to the base portion 54.

A guide arm generally referred to by the reference numeral 60 is mounted on the free end of the arm 14 and extends transversely thereof. The guide arm 60 includes an elongated longitudinally extending slot 62 by which the guide arm 60 is mounted for longitudinal movement. Adjusted positions of the guide arm 60 may be maintained by means of the locking screw 64 which projects through the slot 62 and the end of the guide arm 60 adjacent the free end of the arm 16 includes a blade guide assembly generally referred to by the reference numeral 66. The blade guide assembly 66 is removably secured to the lower end of the guide arm 60 by means of any suitable fastener 68 and it will be noted from FIGURE 3 of the drawings that the fastener 68 is received through a slot 70 formed in the base 72 of the blade guide assembly. In this manner, the blade guide assembly 66 may be adjusted transversely of the plane in which the blade 74 of the saw is disposed. Additionally, the blade guide assembly is provided with a transversely extending and elongated mounting shank 76 which may be longitudinally adjusted and retained in adjusted positions by means of setscrew 78. The guide element generally referred to by the reference numeral 80 is adjustably mounted on the mounting shank 76 by means of a setscrew 90 for movement transversely of the plane of the saw blade portion with which it is engaged and the guide element 80 includes a pair of adjustable guiding elements 92 for guiding movement of the saw blade 74 from opposite sides thereof.

With attention now directed again to FIGURE 5 of the drawings there will be seen a worktable generally referred to by the reference numeral 94. The worktable 94 is provided with a mounting lug 96 and the mounting lug 96 is pivotally secured to the arm 16 by means of pivot bolt 98. A support arm 99 is pivotally secured to the worktable 94 at one end a spaced distance from the pivotal connection of the mounting lug 96 with the arm 16 as at 100 and the support arm 99 includes a longitudinal slot 102 in which the shank of the clamping screw 104 secured to the arm 16 is slidably received. The clamping screw 104 may be tightened in order to retain the shank thereof at a selected position along the slot 102 in order to maintain the worktable 94 in adjusted tilted positions.

Each of the arms 14 and 16 includes a center web portion 106 and a plurality of stub axles 108 are journalled in each of the web portions 106 and project from opposite sides thereof. Each of the stub axles 108 has a roller guide wheel 110 mounted on one end portion for rotation therewith and a drive wheel 112 mounted on the other end portion. An endless flexible member in the form of a chain 114 is entrained about the drive wheels of each of the arms 14 and 16 whereby the drive wheels 110 of each of the arms 14 and 16 are drivingly connected. The innermost stub axle 108 carried by each arm 14 and 16 also includes a driven wheel 116 which is secured thereto for rotation with that corresponding stub axle 108. An endless flexible member in the form of a chain 118 is entrained about the driven wheels 116 and is disposed in first and second reaches 120 and 122.

The support member 18 includes a laterally projecting and generally horizontal support slide assembly generally referred to by the reference numeral 124. A slide member 126 is slidably mounted in the slide assembly 124 for movement longitudinally thereof and the slide assembly includes an elongated longitudinally extending slot 128 through which the free ends of stub axles 130 and 132 project, see FIGURE 4. A pair of tensioning wheels 134 and 136 are rotatably journalled on the free ends of the stub axles 130 and 132 respectively and are engaged with the reaches 120 and 122 respectively of the endless flexible member 118 and laterally deflect the reaches 120 and 122. The slide member 126 has one end of an adjusting screw 138 rotatably journalled in a bearing block 140 carried by the outer end of the slide assembly 124 and the threaded shank portion 142 of the adjustment screw 138 is threadedly engaged in a threaded bore 144 formed through a boss portion 146 of the slide member 126. In this manner, the slide member 126 may be adjustably positioned longitudinally of the slide assembly 124 and the slot 128 by adjustment of the adjusting screw 138.

Each of the web portions 106 includes a tensioning arm 150 pivotally secured to the corresponding web portion 106 as at 152 and each of the web portions 106 includes an arcuate slot 154 having the axis of rotation of the corresponding tensioning arm 150 as its center of curvature. The free end of each of the tensioning arms 150 is provided with a fastener 156 which extends through the corresponding slot 154 and may be tightened to adjustably position the tensioning arm 150 about its axis of rotation. The mid-portion of each of the tensioning arms 150 has a tensioning wheel 158 rotatably journalled thereon and each of the tensioning wheels 158 is disposed in engagement with the corresponding endless flexible member 114. In this manner, each of the endless flexible members 114 may also be maintained at proper tension.

With attention directed to arm 16 in FIGURE 5, it will be seen that a drive wheel 160 is also drivingly engaged with the endless flexible member 114 carried by the arm 116 and that the drive wheel 160 is rotatably journalled on a shaft 162, see FIGURE 2, journalled through the web portion 106 of the arm 16. The other end of the shaft 162 has a blower blade 164 secured thereto and in this manner the blower blade 164 is rotated upon actuation of the electric motor 58.

It is to be noted that the locking screw 42 may be removed in order to disengage the leg portion 20 from the support member 18. If it is desired to break down the saw 10, the slide member 126 is moved inwardly of the slide assembly 124 by adjustment of the adjustment screw 138 in order to loosen the endless flexible member 120. Then, the endless flexible member 120 may be disengaged from the tensioning wheels 134 and 136 and from either of the driven wheels 116. Then, the screw 30 may be manipulated to move the arms 14 and 16 toward each other in order to relieve the tension on the saw blade 74 whereupon the latter may be removed. Then, the leg portion 20 may be withdrawn from within the support member 18.

In operation the screws 30 and 138 are first adjusted to properly position the arms 14 and 16 relative to each other in order to obtain the desired spatial relationship of the arms 14 and 16. Then, the correct size of saw blade 74 may be entrained about the guide wheels 110. Then, the arm 14 may be moved slightly away from the arm 16 in order to tension the saw blade 74 and the slide member 126 may be adjusted upon manipulation of the adjusting screw 138 in order to properly tension the endless flexible member 118. In addition, the tensioning arms 150 may also be adjusted to properly tension the endless flexible members 114.

From FIGURES 3 and 6 of the drawings it may be seen that the shafts 108 carried by the arms 14 and 16 and closest to the support member 18 are elongated and that the driven wheels 116 are carried by the ends of these shafts remote from the roller guide wheels 110 carried thereby. Additionally, it may be seen that the shaft 108 carried by the arm 14 is even further elongated and has secured to its extreme end portion a pulley wheel 170 which is drivingly connected to the pulley wheel 172 carried by the output shaft 174 of the rotor 58 by means of an endless flexible belt 176.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A band saw comprising a generally C-shaped frame including a pair of spaced support arms and an elongated connecting means, said arms extending laterally to one side of and from points spaced longitudinally of said elongated connecting means and interconnecting corresponding end portions of said arms, each of said arms including a plurality of aligned anti-friction roller means spaced and curved longitudinally of said arms and defining arcuate paths opening toward each other, an endless band saw blade entrained over said roller means and including a first portion adjacent and generally paralleling said support member and a second portion extending between the free ends of said arms, a first of said arms including means for adjustably positioning said first arm relative to said second arm, motor means mounted stationarily relative to one of said arms, aligned drive wheel means carried by the roller means of each arm remote from the free end of that arm, endless drive member means entrained about said drive wheel means, drive means drivingly connecting said motor means to the drive wheel means of one of said arms, said elongated support means including adjustment means for adjustably positioning said first arm relative to said second arm and comprising two elongated overlapping and relatively extendable members one of which is supported from the first arm and the other of which is supported from the second arm, means for effecting the relative adjustment of the overlapped members, and tension wheel means journaled from support members supported from said adjustment means for adjustable movement toward and away from said free ends of said arms and in a plane generally paralleling the plane containing said drive wheel means, said endless drive member including at least one reach thereof entrained over said tension wheel means for increasing the tension of said endless drive member upon adjustment of said tension wheel means away from the free ends of said arms.

2. The combination of claim 1 including a guide arm carried by the free end of one of said arms and extending transversely thereof toward said other arm and mounted on said one arm for adjusted longitudinal movement, anti-friction guide means carried by said guide arm on the end thereof adjacent the other arm and guidingly engaging said band saw blade.

3. The combination of claim 1 including a tiltable workable carried by the free end of said second arm.

4. The combination of claim 1 wherein said tension wheel means includes a pair of tensioning wheels each engaged with and laterally deflecting a corresponding reach of said endless drive member.

5. The combination of claim 1 including blower means carried by one of said arms and operatively connected to said drive means.

6. The combination of claim 1 wherein said adjustment means includes means for locking said telescoping members in adjusted position.

7. The combination of claim 1 wherein said adjustment means includes means for locking said overlapped members in adjusted extended positions.

References Cited in the file of this patent

UNITED STATES PATENTS

| | | |
|---|---|---|
| 340,964 | Thomas | Apr. 27, 1886 |
| 406,396 | Gilmore | July 2, 1889 |
| 2,579,955 | Orescan | Dec. 25, 1951 |
| 2,627,881 | Houtte et al. | Feb. 10, 1953 |

FOREIGN PATENTS

| | | |
|---|---|---|
| 191,833 | Great Britain | Jan. 22, 1923 |